(«12») United States Patent
Nagai

(10) Patent No.: US 8,514,253 B2
(45) Date of Patent: Aug. 20, 2013

(54) IMAGE DATA PROCESSING METHOD AND IMAGE DISPLAY SYSTEM WITH REDUCTION OF IMAGE DATA TRANSFER AMOUNT

(75) Inventor: Kazuki Nagai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 904 days.

(21) Appl. No.: 12/647,996

(22) Filed: Dec. 28, 2009

(65) Prior Publication Data

US 2010/0171746 A1    Jul. 8, 2010

(30) Foreign Application Priority Data

Jan. 8, 2009   (JP) ................. 2009-002243

(51) Int. Cl.
*G09G 5/00* (2006.01)
*H04N 7/12* (2006.01)
*H04N 11/02* (2006.01)
*H04N 11/04* (2006.01)

(52) U.S. Cl.
USPC ............ 345/667; 345/625; 375/240.01

(58) Field of Classification Search
None
See application file for complete search history.

(56) References Cited

U.S. PATENT DOCUMENTS

| 5,457,780 | A | * | 10/1995 | Shaw et al. .................. 345/502 |
| 5,463,422 | A | * | 10/1995 | Simpson et al. ........... 348/390.1 |
| 5,612,748 | A | * | 3/1997 | Gohshi et al. ............ 375/240.21 |
| 5,737,027 | A | * | 4/1998 | Demos .......................... 348/474 |
| 5,982,373 | A | * | 11/1999 | Inman et al. ................ 345/419 |
| 6,795,581 | B1 | * | 9/2004 | Nomura ....................... 382/232 |
| 7,280,708 | B2 | | 10/2007 | Song et al. |
| 2006/0008154 | A1 | * | 1/2006 | Belle ............................ 382/232 |
| 2006/0193380 | A1 | * | 8/2006 | Laksono .................. 375/240.01 |
| 2006/0210184 | A1 | | 9/2006 | Song et al. |
| 2012/0075525 | A1 | * | 3/2012 | Bennett ....................... 348/441 |

FOREIGN PATENT DOCUMENTS

JP    A-2003-274415    9/2003

* cited by examiner

*Primary Examiner* — Carlos Perromat
(74) *Attorney, Agent, or Firm* — Oliff & Berridge, PLC

(57) ABSTRACT

An image data processing method for an image display system, includes: providing the image display system with an image display device, an information processing device, and a transfer section; obtaining a transfer ratio; setting a plurality of pixel data extraction blocks to the image data; comparing present frame data and previous frame data; setting a pixel position of pixel data to be transferred at present moment; transferring the pixel data to be transferred; setting a plurality of pixel data writing blocks in a display area of the image data; receiving the pixel data by the image display device; setting a writing pixel position and a writing pixel count used when writing the pixel data; and updating pixel data in the pixel data writing block by writing the pixel data into the pixel data writing block.

14 Claims, 7 Drawing Sheets

IMAGE DATA PROCESSING METHOD AND IMAGE DISPLAY SYSTEM WITH REDUCTION OF IMAGE DATA TRANSFER AMOUNT

BACKGROUND

1. Technical Field

The present invention relates to an image data processing method suitable for the case of transferring image data by a transfer section having an amount of data transferred every unit time smaller than an amount of the image data and an amount of data an image display device can display every unit time, and to an image display system having such a transfer section of the image data.

2. Related Art

In the case of transferring image data (assumed to be non-compressed image data) from an information processing device (e.g., a personal computer) holding a content with a large amount of data such as a moving image or a still image to a high resolution image display device (e.g., a projector), there arises a problem that it is not achievable to perform image reproduction taking full advantage of the amount of data the content has and the capacity of the image display device due to an impediment posed by an insufficient transfer capacity (transfer rate) of a transfer section intervening between the information processing device and the image display device.

In the case in which the transfer rate of the transfer section poses an impediment as described above, there is often taken a method of determining the resolution and the frame rate so as to be suitable for the transfer capacity of the transfer section. However, according to this method, since the resolution and the frame rate are determined in a fixed manner, there arises a problem that it is not achievable to take advantage of the amount of data the content has and the resolution obtained by the capacity of the image display device, thus it is not achievable to perform high quality image reproduction.

Incidentally, there is known a technology of adaptively performing image encoding in accordance with space-time complexity of the content (see, e.g., JP-A-2003-274415).

The technology (hereinafter referred to as a related art technology) disclosed in JP-A-2003-274415 is used in, for example, the information processing device in order for making it possible to store the content as the image data of a smaller amount. However, since the image data stored in the information processing device is generally transferred in a non-compressed state when being transferred to the image display device, if the transfer capacity of the transfer section is low, there ultimately arises the problem that it is not achievable to perform high quality image reproduction taking advantage of the amount of data of the content and the resolution of the image display device.

SUMMARY

An advantage of some aspects of the invention is to provide an image data processing method and an image display system capable of achieving high quality image display independent of the transfer capacity of the transfer section.

According to an aspect of the invention, there is provided an image data processing method for an image display system, comprising (a) providing the image display system with an image display device adapted to display an image based on image data, an information processing device adapted to transfer the image data to the image display device, and a transfer section intervening between the information processing device and the image display device, (b) obtaining a transfer ratio from a ratio between an amount of data the image display device can display every unit time and an amount of data the transfer section can transfer every unit time, (c) setting a plurality of pixel data extraction blocks, each of which includes a corresponding number of pixels to the transfer ratio, to the image data, (d) comparing present frame data and previous frame data of consecutive frames in the image data, (e) setting a pixel position of pixel data to be transferred at present moment in the present frame out of the pixel data of pixels included in each of the plurality of pixel data extraction blocks based on the result of the comparison in step (d), (f) transferring the pixel data to be transferred, from the information processing device to the image display device, (g) setting a plurality of pixel data writing blocks corresponding to the plurality of pixel data extraction blocks in a display area of the image data, (h) receiving the pixel data, which is transferred from the information processing device, by the image display device, (i) setting a writing pixel position and a writing pixel count used when writing the pixel data, which is transferred in step (f), into the pixel data writing block, and (j) updating pixel data in the pixel data writing block by writing the pixel data into the pixel data writing block.

According to the image data processing method of this aspect of the invention, the data transfer independent of the transfer capacity of the transfer section becomes possible even in the case of transferring the non-compressed image data from the information processing device (e.g., a personal computer) holding the content of a large amount of data to the image display device (e.g., a projector) capable of high-resolution image display using the transfer section with low transfer capacity.

According to another aspect of the invention, in the image data processing method of the above aspect of the invention, it is preferable that the step of (k) updating a count value of a counter adapted to count a number of the consecutive frames based on the result of the comparison in step (d) is further provided, and the pixel position of the pixel data to be transferred from the information processing device to the image display device is set based on the count value.

According to another aspect of the invention, in the image data processing method of the above aspects of the invention, it is assumed that the amount of data the transfer section transfers every unit time is smaller than an amount of the image data and the amount of data the image display device can display every unit time.

The image data processing method according to this aspect of the invention provides a significant advantage in the case in which the amount of data the transfer section transfers every unit time is smaller than the amount of the image data and the amount of data the image display device can display every unit time.

According to still another aspect of the invention, in the image data processing method of the above aspects of the invention, it is preferable that the step of performing, by the information processing device, resolution conversion on the image data so as to have resolution equal to resolution the image display device has is further provided.

This is a process to be executed in the case in which the resolution of the content and the resolution of the image display device are different from each other, and by performing such a process, it becomes possible to make the resolutions of the both equal to each other, and it is possible to make the image data processing method of this aspect of the invention easier to realize.

According to yet another aspect of the invention, in the image data processing method of the above aspects of the invention, it is preferable that the pixel data extraction blocks and the pixel data writing blocks are each shaped as a rectangle, and a horizontal pixel count and a vertical pixel count of the rectangle are set so that a product of the horizontal pixel count and the vertical pixel count has a value equal to the transfer ratio.

Thus, it becomes possible to set the number of the pixels included in each of the pixel data extraction block and the pixel data writing block to be the value obtained by the transfer ratio. For example, if the transfer ratio is "4," the pixel data extraction block and the pixel data writing block are each composed of four pixels. It should be noted that the horizontal pixel count and the vertical pixel count of each of the pixel data extraction block and the pixel data writing block are preferably set so that the pixel data extraction block and the pixel data writing block each have a square or a further approximately square shape. Therefore, in the case in which the transfer ratio is "4," it is preferable to set the horizontal pixel count to be "2," and the vertical pixel count to be "2."

According to still yet another aspect of the invention, in the image data processing method of the above aspects of the invention, it is preferable that the step (k) is executed if it is determined that a level of consistency between the present frame data and the previous frame data is high based on the result of the step (d).

In this aspect of the invention, the update of the count value is performed in the case in which the image is hardly varied between the contiguous frame data (the level of the consistency between the present frame data and the previous frame data is high). As described above, since it is sufficient to transfer only the specific pixel data based on the count value at the present moment in the case in which the image is hardly varies between the contiguous frame data, it becomes possible to reduce the amount of data to be transferred.

According to further another aspect of the invention, in the image data processing method of the above aspects of the invention, it is preferable that the pixel position of the pixel data to be transferred is determined based on the number of pixels included in the pixel data extraction block and the count value.

For example, if the transfer ratio is "4," the pixel data extraction block is set using four pixels as one processing unit. Further, in the case in which the image is hardly varied between the consecutive frame data, the specific pixel data is sequentially transferred from each of the pixel data extraction blocks as the count value increases. By executing the process described above, the data transfer independent of the transfer capacity of the transfer section becomes possible, and even in the image display system using the transfer section with low transfer capacity, it is possible to make the image display device display a high-quality image taking full advantage of the resolution provided to the image display device.

According to a further aspect of the invention, in the image data processing method of the above aspects of the invention, it is preferable that the pixel position of the pixel data to be transferred is set so as to be sequentially shifted in the pixel data extraction block in a predetermined order every time the count value is updated.

According to this aspect of the invention, it is possible to sequentially extract the pixel data to be transferred out of the pixel data in the pixel data extraction block in a predetermined order in the pixel data extraction block every time the count value is updated.

According to a still further aspect of the invention, in the image data processing method of the above aspects of the invention, it is preferable that the writing pixel position of the pixel data in the pixel data writing block is set based on the number of pixels included in the pixel data extraction block and the count value of the counter at a present moment, and the writing pixel position is set so as to be sequentially shifted in the pixel data writing block in a predetermined order every time the count value is updated.

According to this aspect of the invention, it is possible to sequentially write the pixel data transferred from the information processing device into the predetermined pixel position of the pixel data writing block corresponding to the pixel data extraction block.

According to a still yet further aspect of the invention, in the image data processing method of the above aspects of the invention, it is preferable that the writing pixel count of the pixel data in the pixel data writing block is set based on the number of pixels included in the pixel data extraction block and the count value at the present moment.

According to this aspect of the invention, by writing the pixel data into a part of the pixel data writing block started from the writing pixel position and corresponding to the predetermined writing pixel count in a predetermined order, it is possible to sequentially update the pixel data in the pixel data writing block.

According to a furthermore aspect of the invention, in the image data processing method of the above aspects of the invention, it is preferable that assuming the number of pixels included in the pixel data extraction block as n (n is a natural number), the writing pixel count is set so as to decrease under a predetermined rule as the count value increases until the count value reaches n−1.

For example, it is for performing such a writing process in which assuming that the transfer ratio is "4," in the transfer stage of the first frame data (assuming that the count value is "0"), the pixel data transferred thereto is written into all of the four pixel positions of the pixel data writing block, in the transfer stage of the second frame data (assuming that the count value is "1"), the pixel data transferred thereto is written into two pixel positions started from the predetermined writing pixel position of the pixel data writing block, thereby performing the update of the two pixel data, in the transfer stage of the third frame data (assuming that the count value is "2"), the pixel data transferred thereto is similarly written into two pixel positions started from the predetermined writing pixel position of the pixel data writing block, thereby performing the update of the other two pixel data, in the transfer stage of the fourth frame data (assuming that the count value is "3"), the writing process of the transferred pixel data is executed such that one pixel data is written in a predetermined pixel position to perform the update of one pixel data, and by performing such a writing process, in this case, at the point of time when the transfer of the fourth frame data is completed, the resolution equal to that of the content can be obtained.

In other words, in this case, the resolution is gradually increased after displaying the first frame data, and at the moment when the fourth frame data is displayed, the image displayed by the image display device becomes to have the same resolution as that of the content. In this case, although it is required to transfer four frame data until the resolution becomes the same as that of the content, since it requires only a short period of time as a whole, no substantial influence is exerted.

According to a still furthermore aspect of the invention, in the image data processing method of the above aspects of the invention, it is preferable that assuming the number of pixels included in the pixel data extraction block as n (n is a natural number), when the count value exceeds n, the pixel data in a pixel position corresponding to a pixel position of the pixel data transferred is updated, out of the pixel data written in the writing pixel position.

This is the case in which the state with no substantial change in the substance of the content continues for a long period of time, and in such a case, the pixel data having already been written in the pixel data writing block is updated with the pixel data newly transferred thereto, for example, pixel-by-pixel. By performing such a process, it becomes possible to perform image display following the variation of the substance of the content while keeping the resolution constant in the case in which the substance of the content is varied gradually.

According to a yet furthermore aspect of the invention, in the image data processing method of the above aspects of the invention, it is preferable that the update of the count value corresponds to increment of the count value.

Thus, in the case in which the image is hardly varied between the contiguous frame data (the level of the consistency between the present frame data and the previous frame data is high), the count value can be incremented by one.

According to a still yet furthermore aspect of the invention, there is provided an image display system including an image display device adapted to display an image based on image data, an information processing device adapted to transfer the image data to the image display device, and a transfer section intervening between the information processing device and the image display device, the information processing device including a transfer ratio calculation section adapted to obtain a transfer ratio from a ratio between an amount of data the image display device can display every unit time and an amount of data the transfer section can transfer every unit time, a pixel data extraction block setting section adapted to set a plurality of pixel data extraction blocks, each of which includes a corresponding number of pixels to the transfer ratio, to the image data, a frame comparison section adapted to compare present frame data with previous frame data of consecutive frames in the image data, a transfer pixel position setting section adapted to set a pixel position of pixel data to be transferred at present moment in the present frame out of the pixel data of pixels included in each of the plurality of pixel data extraction blocks based on the result of the comparison, and a transfer control section adapted to transfer the pixel data to be transferred to the image display device, and the image display device including a pixel data writing block setting section adapted to set a plurality of pixel data writing blocks corresponding to the plurality of pixel data extraction blocks in a display area of the image data, a data receiving section adapted to receive the pixel data transferred from the information processing device, a writing pixel position/writing pixel count setting section adapted to set a writing pixel position and a writing pixel count used when writing the pixel data, which is transferred, into the pixel data writing block, and a writing control section adapted to write the pixel data into the pixel data writing block, thereby updating pixel data in the pixel data writing block.

According to the image display system of this aspect of the invention, as described with respect to the image data processing method of the above aspect of the invention, even in the case of transferring the non-compressed image data from the information processing device holding the content of a large amount of data to the image display device capable of high-resolution image display using the transfer section with low transfer capacity, the data transfer independent of the transfer capacity of the transfer section becomes possible, and it becomes possible for the image display device to perform image display taking full advantage of the resolution provided to the image display device. It should be noted that it is preferable to provide the features of the image data processing method according to the aspects of the invention described above to the image display system according to this aspect of the invention.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Hereinafter, an embodiment of the invention will be explained.

Figure 1:
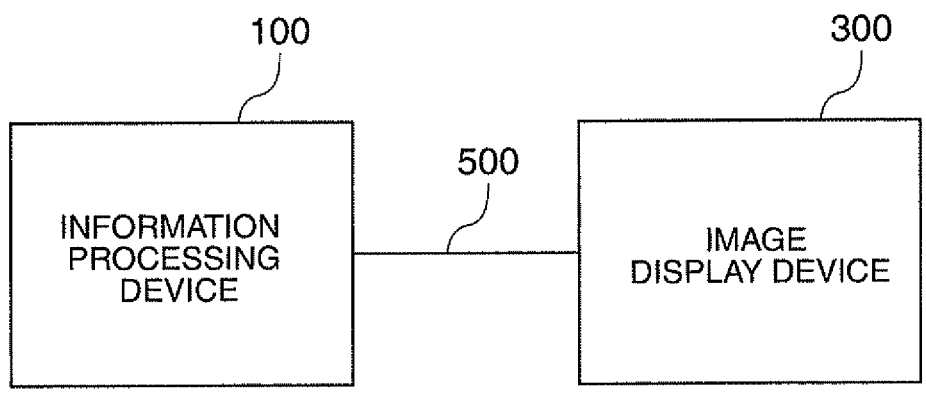
FIG. 1 is a diagram showing a configuration of an image display system according to an embodiment of the invention.

FIG. 1 is a diagram showing a configuration of an image display system according to the embodiment of the invention. As shown in FIG. 1, the image display system according to the embodiment of the invention has an information processing device 100 such as a personal computer having a function of holding image data corresponding to an image (hereinafter referred to as a content) to be displayed and of controlling transfer of the image data held, an image display device 300 such as a projector for displaying an image based on the image data thus held by the information processing device 100, and a transfer section 500 intervening between the information processing device 100 and the image display device 300 and having an amount data transferred every unit time smaller compared to the amount of image data and the amount of data the image display device 300 can display every unit time.

Further, in the image display system according to the embodiment, it is assumed that a ratio between the amount of data the image display device can display every unit time and the transfer capacity (the amount of data transferred every unit time) of the transfer section 500, namely a value obtained by dividing the amount of data, which the image display device 300 can display every unit time, by the amount of data transferred by the transfer section 500 every unit time is called a transfer ratio. It should be noted that the amount of data the image display device 300 can display every unit time is assumed to be represented as "(the resolution of the image display device 300 ((the number of pixels aligned in a horizontal direction)×(the number of pixels aligned in a vertical direction)))×(the frame rate)×(the number of bits per pixel ((the number of grayscales)×(the number of colors)))."

For example, if the resolution of the image display device 300 is 3,840 pixels×2,160 pixels, the frame rate is 30 frames/sec, and the number of bits per pixel is 8 bits×3 (RGB), then the amount of data the image display device 300 can display every unit time is obtained as follows.

3,840(pixels)×2,160(pixels)×30(frames/sec)×24(bits)
=5,971,968,000 (bps)

On the other hand, assuming that the transfer capacity of the transfer section 500 is as follows, the amount of data the transfer section 500 can transfer is 1,492,992,000 (bps).

1,920(pixels)×1,080(pixels)×30(frames/sec)×24(bits)

Therefore, the transfer ratio in this case is obtained as 5,971,968,000/1,492,992,000=4. In the embodiment of the invention, explanations will hereinafter be presented assuming that the transfer ratio is "4."

Figure 2:
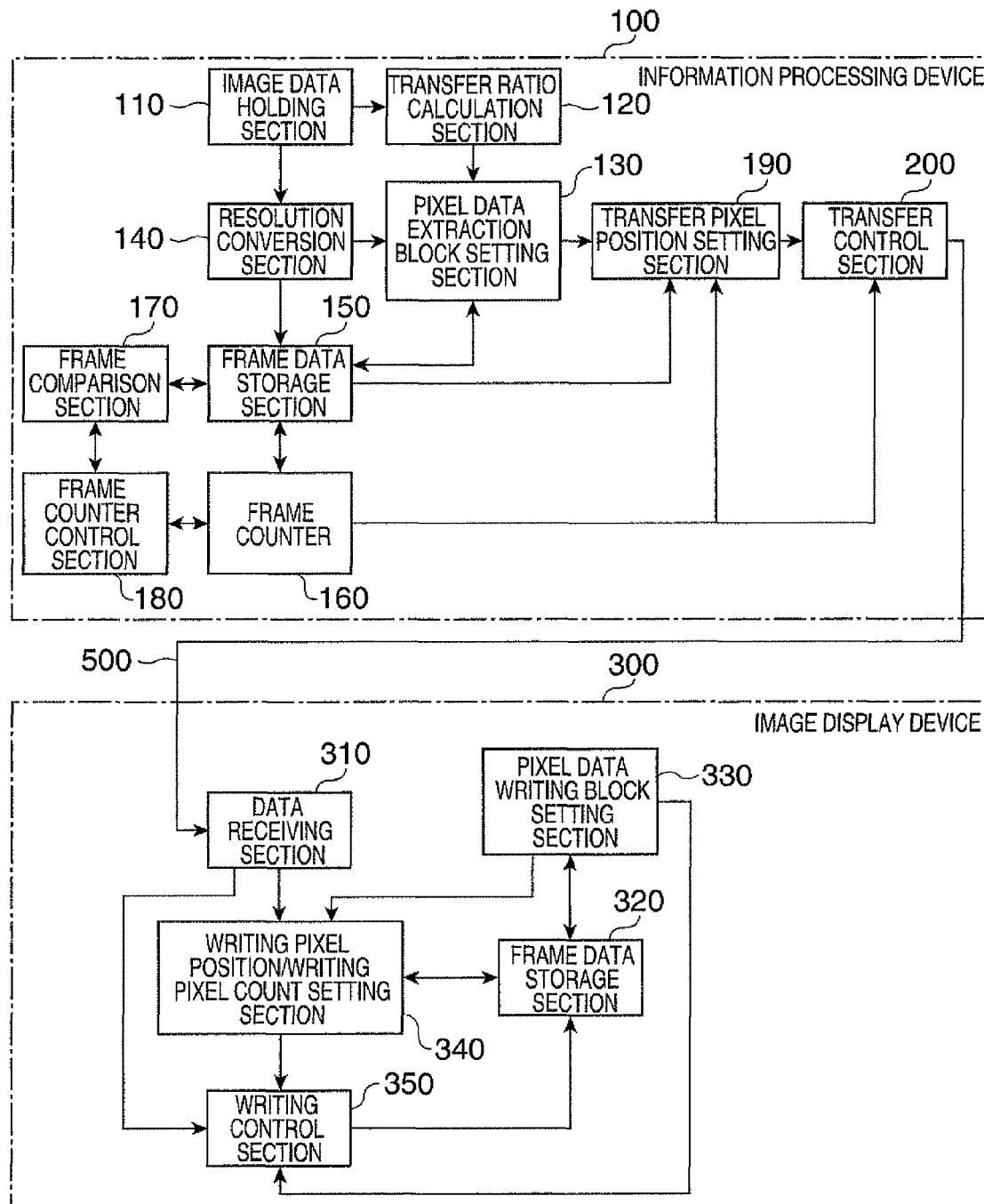
FIG. 2 is a diagram showing a functional block diagram of an information processing device 100 and an image display device 300 shown in FIG. 1.

FIG. 2 is a diagram showing a functional block diagram of the information processing device 100 and the image display device 300 shown in FIG. 1. As shown in FIG. 2, the information processing device 100 has an image data holding section 110 for holding the image data, a transfer ratio calculation section 120 for calculating the transfer ratio, a pixel data extraction block setting section 130 for setting a plurality of pixel data extraction blocks, which are used for extracting the pixel data of a specific pixel out of the processing unit formed of the number of pixels (4 pixels since (transfer ratio) =4 is satisfied here) represented as the transfer ratio, with respect to the image data in a lattice-like pattern, a resolution conversion section 140 for converting the resolution of the image data into the resolution identical to that of the image display device 300, a frame data storage section 150 for storing at least two consecutive frame data (the present frame data and the frame data previous to the present frame data), a counter (hereinafter referred to as a frame counter) 160 for counting the number of frames, a frame comparison section 170 for determining how high the level of the consistency between the present frame data and the frame data previous to the present frame data (hereinafter referred to as a previous frame data) out of the consecutive frames is, a frame counter control section 180 for updating (incrementing) the count value if the frame comparison section 170 determines, after setting the count value of the frame counter to be "0" as an initial value, that the consistency between the present frame data and the previous frame data is high, or resetting the count value to be "0" if the frame comparison section 170 determines that the consistency is low, a transfer pixel position setting section 190 for setting the position (hereinafter referred to as a pixel position) of the pixel to be transferred at the present moment in the present frame out of the pixels belonging to each of the pixel data extraction blocks based on the count value at the present moment, and a transfer control section 200 for transferring the image data corresponding to the pixel position of the pixel to be transferred and the count value of the frame counter 160 at the present moment to the image display device 300 with the transfer section 500.

On the other hand, the image display device 300 has a data receiving section 310 for receiving the pixel data and the count value at the present moment transmitted from the information processing section 100, a pixel data writing block setting section 330 for setting a plurality of pixel data writing blocks corresponding to the plurality of pixel data extraction blocks, which is set by the information processing section 100, in an image data display area (an image data writing area corresponding to an image data display area of a frame data storage section 320), a writing pixel position/writing pixel count setting section 340 for setting a writing pixel position and the number of writing pixels used when writing the pixel data thus transferred in the pixel data writing block, and a writing control section 350 for writing the pixel data in the part of the pixel data writing block started from the set writing pixel position and corresponding to the set number of writing pixels, thereby performing an update of the pixel data in the pixel data writing block.

Further, the pixel data extraction block and the pixel data writing block each have a rectangular shape, and each have a horizontal pixel count (denoted as hh) of the rectangular shape and a vertical pixel count (denoted as hv) thereof set so that the product of the horizontal pixel count hh and the vertical pixel count hv has a value equal to the transfer ratio ((transfer ratio)=4, in this case).

It should be noted that the horizontal pixel count and the vertical pixel count of each of the pixel data extraction block and the pixel data writing block are preferably set so that the pixel data extraction block and the pixel data writing block each have a square or an approximately square shape. Therefore, since it is assumed in the image display system according to the present embodiment that (transfer ratio)=4 is satisfied, the horizontal pixel count hh of each of the pixel data extraction block and the pixel data writing block is set to be "2," and the vertical pixel count hv thereof is set to be "2."

Figure 3A:
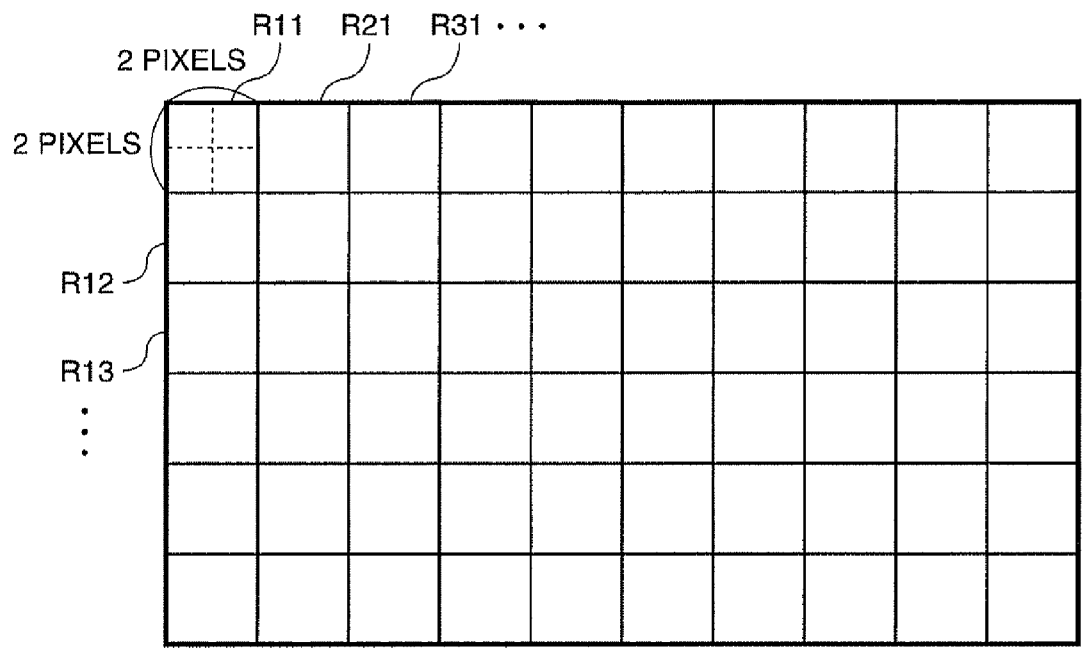
FIGS. 3A and 3B are diagrams showing a setting example of a pixel data extraction block and a pixel data writing block.
Figure 3B:
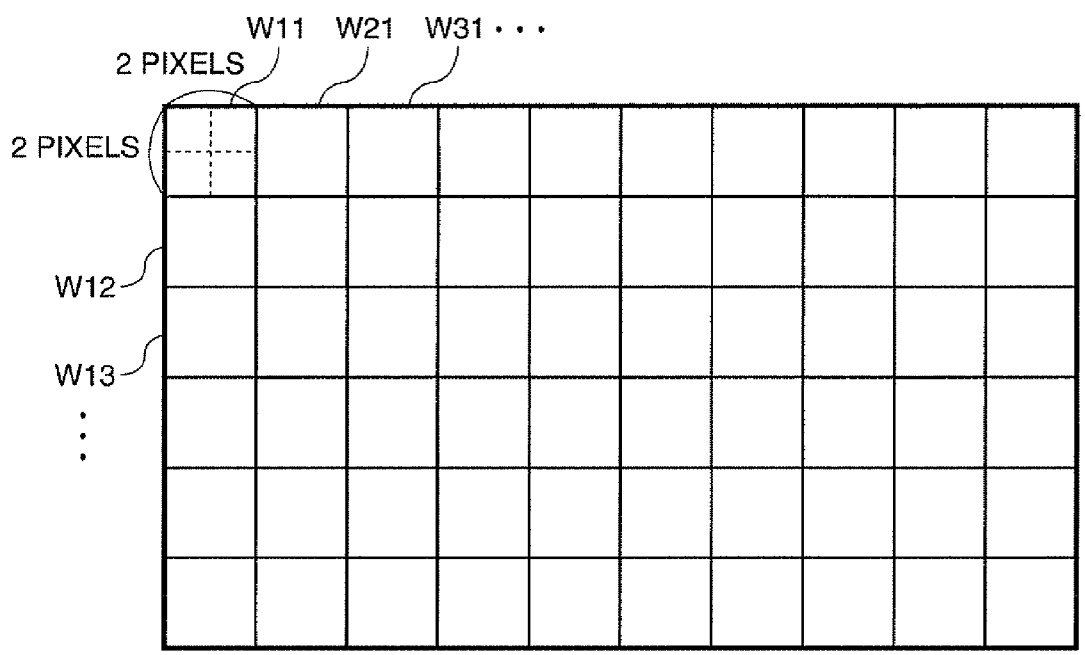

FIGS. 3A and 3B are diagrams showing a setting example of the pixel data extraction block and the pixel data writing block. FIG. 3A is a diagram showing the setting example of the pixel data extraction block, wherein each of the pixel data extraction blocks R11, R21, R31, . . . , R12, R13, . . . is represented by a lattice cell. Further, FIG. 3B is a diagram showing the setting example of the pixel data writing block, wherein each of the pixel data extraction blocks W11, W21, W31, . . . , W12, W13, . . . is represented by a lattice cell, and the entire area surrounded by the outer frame indicated by the thick line corresponds to the image display area.

Further, since the transfer ratio is "4" in the image display system according to the embodiment, it is assumed that each of the pixel data extraction block and the pixel data writing block is composed of totally four pixels arranged so that two pixels are aligned in both of the horizontal and vertical directions. It should be noted that the following formulas can be exemplified as a method of calculating the horizontal pixel count hh and the vertical pixel count hv in each of the pixel data extraction block and the pixel data writing block.

$$hh \text{ (or } hv) = rounddown\left(\sqrt{\text{transfer ratio}}\right) \quad (1)$$

$$hv \text{ (or } hh) = rounddown\left(\frac{\text{transfer ratio}}{rounddown\left(\sqrt{\text{transfer ratio}}\right)}\right) \quad (2)$$

It should be noted that in the formula 1 and formula 2, "rounddown( )" denotes that the fractional part of the numerical value in the parenthesis ( ) is truncated.

For example, if (transfer ratio)=4 is satisfied, hh (or hv)=2 is obtained from the formula 1, and hv (or hh)=2 is obtained from the formula 2, and therefore, "2 pixels×2 pixels" is obtained. Further, if (transfer ratio)=3 is satisfied, hh (or hv)=1 is obtained from the formula 1, and hv (or hh)=3/1=3 is obtained from the formula 2, and therefore, "3 pixels×1 pixel" or "1 pixel×3 pixels" is obtained.

Figure 4:
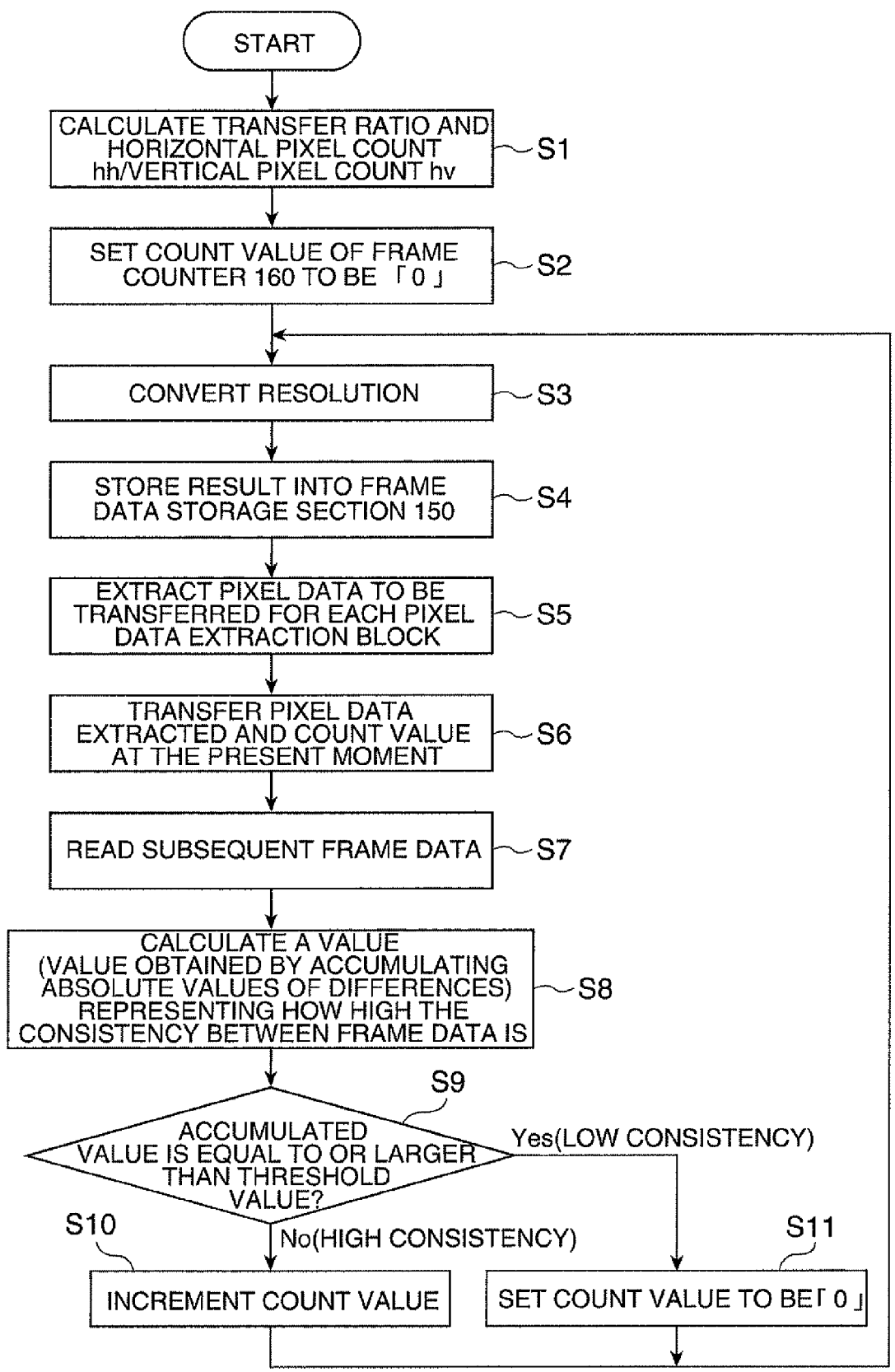
FIG. 4 is a flowchart for explaining an image data processing procedure of the information processing device 100 in the image display system according to the embodiment.

FIG. 4 is a flowchart for explaining the processing procedure of the information processing device 100 in the image display system according to the embodiment. As shown in FIG. 4, in the processing procedure of the information processing device 100, the transfer ratio is calculated, and at the same time, the horizontal pixel count hh of the pixel data extraction block and the vertical pixel count hv thereof are calculated (step S1). In the embodiment, since the transfer ratio is "4," and the number of pixels included in each of the pixel extraction blocks is four (two pixels in each of the horizontal and vertical directions), hv=2 and hh=2 are assumed.

Subsequently, the count value of the frame counter 160 is set to be "0" (step S2). Further, in the case in which the resolution of the content held in the information processing device 100 is different from the resolution of the image display device 300, the resolution conversion is performed so that the resolution of the frame data (present frame data) as a processing object at the present moment becomes equal to the resolution of the image display device 300 (step S3), and then the present frame data on which the resolution conversion has been executed is stored into the frame data storage section 150 (step S4).

Subsequently, the specific pixel data (assumed to be the data corresponding to one pixel) to be transmitted to the image display device 300 is extracted from the four pixels included in each of the pixel data extraction blocks for each of the pixel data extraction blocks (step S5). The pixel data thus extracted in each of the pixel data extraction blocks and the count value of the frame counter 160 at the present moment are transferred to the image display device 300 (step S6).

It should be noted that regarding the transfer of the count value, in the case in which a control signal such as the Consumer Electronics Control (CEC) of the High Definition Multimedia Interface (HDMI) can be transferred, the count value is transferred as the control signal. Further, in the transfer section without such a control signal, it is also possible, for example, to perform the process of using the data of the first pixel in each of the frames as the data representing the count value and diverting the data of the second pixel to the first pixel.

Subsequently, the next frame is read (step S7), and the value, which represents how high the level of the consistency between the frame data (the present frame data and the previous frame data) is, is calculated (step S8). Specifically, the value, which represents how high the level of the consistency between the frame data is, is calculated between the frame data (assumed to be the present frame data at the present moment) read at the present moment and the frame data (assumed to be the previous frame data) having already been stored in the frame data storage section 150.

Then, whether or not the level of the consistency is high is determined based on the value thus calculated. It should be noted that as the method of determining how high the level of the consistency of the frame data is, there can be exemplified the method of calculating the difference in each of the corresponding pixels between the present frame data and the previous frame data, accumulating the absolute values of the differences in the pixels thus calculated to obtain the accumulated value as the value representing how high the level of the consistency between the frame data is, and determining how high the level of the consistency based on the value is.

Specifically, whether or not the accumulated value thus calculated is equal to or greater than a threshold value is determined (step S9), and if the accumulated value is smaller than the threshold value, it is determined that the level of the consistency between the present frame data and the previous frame data is high, and the process returns to the step S3 after incrementing (+1) the frame counter 160 (step S10). In contrast, if the accumulated value thus calculated is equal to or greater than the threshold value, it is determined that the level of the consistency between the present frame data and the previous frame data is low, and the process returns to the step S3 after resetting the frame counter 160 to "0" (step S11).

Figure 5:
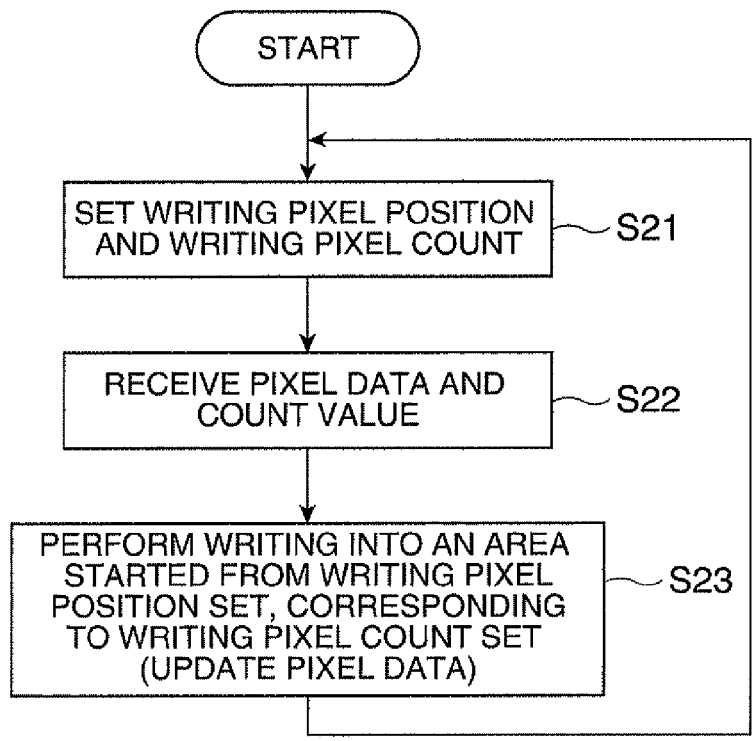
FIG. 5 is a flowchart for explaining an image data processing procedure of the image display device 300 in the image display system according to the embodiment.

FIG. 5 is a flowchart for explaining the processing procedure of the image display device 300 in the image display system according to the embodiment. As shown in FIG. 5, in the processing procedure of the image display device 300, the writing pixel position and the writing pixel count used when writing the transferred pixel data into the respective pixel data writing blocks are set (step S21).

Subsequently, when receiving the pixel data (the pixel data extracted in the respective pixel data extraction blocks) transferred from the information processing device 100 and the count value of the frame counter at the present moment (step S22), the pixel data is written into the part of the pixel data writing blocks started from the pixel position thus set and corresponding to the writing pixel count thus set, thereby performing the update of the pixel data in the pixel data writing blocks (step S23).

Figure 6:
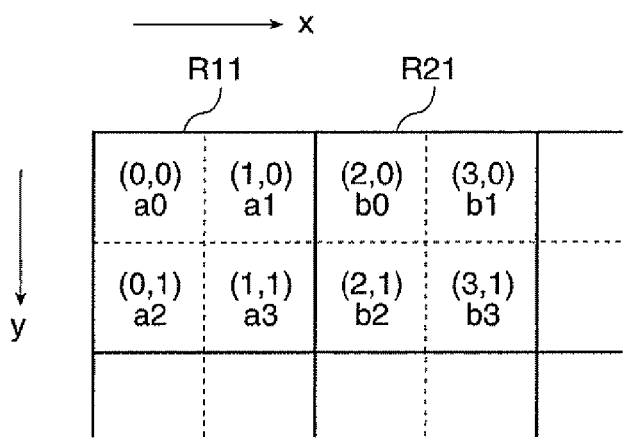
FIG. 6 is a diagram showing coordinate values of four pixel data on an x-y coordinate included in each of the pixel data extraction blocks.

FIG. 6 is a diagram showing coordinate values of four pixel data on an x-y coordinate included in each of the pixel data extraction blocks. It should be noted that although only the pixel data blocks R11, R21 are shown in FIG. 6, the same idea can be applied to other pixel data extraction blocks. Further, it is assumed that in FIG. 6 the four pixel data included in the pixel data extraction block R11 are denoted as a0, a1, a2, and a3, respectively, and that the four pixel data included in the pixel data extraction block R21 are denoted as b0, b1, b2, and b3, respectively.

As shown in FIG. 6, assuming that the coordinate values of the pixel data a0 on the x-y coordinate are (0, 0), the coordinate values of the pixel data a1 are (1, 0), the coordinate values of the pixel data a2 are (0, 1), and the coordinate values of the pixel data a3 are (1, 1) in the case of the pixel data extraction block R11. Further, the coordinate values of the pixel data b0 are (2, 0), the coordinate values of the pixel data b1 are (3, 0), the coordinate values of the pixel data b2 are (2, 1), and the coordinate values of the pixel data b3 are (3, 1) in the case of the pixel data extraction block R21. It should be noted that although not shown in the drawing, the same idea as shown in FIG. 6 can be applied to the coordinate values of the four pixel data in each of the pixel data writing blocks W11, W21, ... set on the image display device 300 side.

FIGS. 7A through 7D are diagrams for explaining specific image data processing of the information processing device 100 and the image display device 300 in the image display system according to the embodiment. It should be noted that the transfer ratio is assumed to be "4" as described above.

Firstly, in the case in which the resolution of the content held in the information processing device 100 is different from the resolution of the image display device 300, the information processing device 100 performs the resolution conversion on the resolution of the frame data (the present frame data) to be the processing object so as to be the same as the resolution of the image display device 300, and the pixel data to be transferred is extracted from the present frame data (hereinafter referred to as first frame data) for each of the pixel data extraction blocks. In this case, what pixel position in each of the pixel data extraction blocks the pixel data is extracted from is determined based on the count value at that point of time. Here, as shown in FIG. 6, it is assumed that the pixel position in each of the pixel data extraction blocks is expressed by the x-y coordinate.

Here, denoting the count value of the frame counter 160 at the present moment as "cnt," an offset position of each of the pixel data extraction blocks as "offset," the horizontal pixel count of the pixel data extraction block as "hh," and the vertical pixel count of the pixel data extraction block as "hv," the pixel position (the x coordinate and the y coordinate) of the pixel data to be extracted from each of the pixel data extraction blocks in the count value at the present moment can be expressed as follows.

$$x = \text{offset} + cnt\%hv \quad (3)$$

$$y = \text{offset} + \{cnt\%(hv \cdot hh)\}/hh \quad (4)$$

It should be noted that in the formula 3 and the formula 4, "offset" represents the coordinate of the upper left pixel data in each of the pixel data extraction blocks. For example, in the pixel data extraction block R11, the coordinate (0, 0) of the pixel data a0 is represented by "offset," and in the pixel data extraction block R21, the coordinate (2, 0) of the pixel data b0 is represented by "offset." Further, in the formula 3, "cnt%hv" denotes that the remainder of the division of "cnt" by "hv" is obtained, and in a similar manner, "cnt%(hv·hh)" in the formula 4 denotes that the remainder of the division of "cnt" by "hv·hh" is obtained. Further, the value obtained by "{cnt%(hv·hh)}/hh" in the formula 4 is the value with the fractional part truncated.

Here, in the case of the pixel data extraction block R11, since the coordinate of "offset" is (0, 0), the position of the pixel to be extracted is obtained as x=0, y=0 from the calculation of the formula 3 and the formula 4 in the case in which the count value is "0" (cnt=0), the position of the pixel to be extracted is obtained as x=1, y=0 in the case in which the count value is "1" (cnt=1), the position of the pixel to be extracted is obtained as x=0, y=1 in the case in which the count value is "2" (cnt=2), and the position of the pixel to be extracted is obtained as x=1, y=1 in the case in which the count value is "3" (cnt=3).

Further, in the case of the pixel data extraction block R21, since the coordinate of "offset" is (2, 0), the position of the pixel to be extracted is obtained as x=2, y=0 from the calculation of the formula 3 and the formula 4 in the case in which the count value is "0" (cnt=0), the position of the pixel to be extracted is obtained as x=3, y=0 in the case in which the count value is "1" (cnt=1), the position of the pixel to be extracted is obtained as x=2, y=1 in the case in which the count value is "2" (cnt=2), and the position of the pixel to be extracted is obtained as x=3, y=1 in the case in which the count value is "3" (cnt=3).

It should be noted that the formula 3 and the formula 4 are also used in the case in which the image display device 300 obtains the writing pixel position of the pixel data transferred thereto. It should be noted that in the case of obtaining the writing pixel position of the pixel data transferred thereto, it is possible to regard the "pixel data extraction block" as the "pixel data writing block."

Hereinafter, the pixel data extraction and writing process will specifically be explained. Firstly, a specific example of the pixel data extraction process in the information processing device 100 will be explained. Here, for the sake of easy understanding of the explanation, the explanation will be presented exemplifying specific pixel data extraction blocks (assumed to be the pixel data extraction block R11 and the pixel data extraction block R21 contiguously located on the right thereof).

Figure 7A:
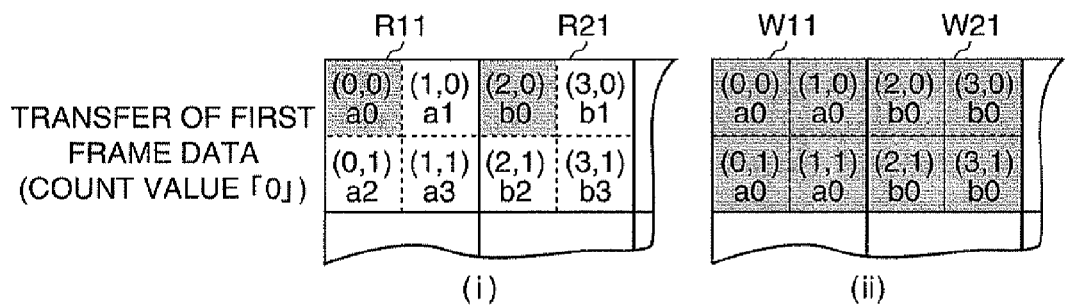
FIGS. 7A through 7D are diagrams for explaining specific image data processing of the information processing device 100 and the image display device 300 in the image display system according to the embodiment.

Firstly, the process of transferring the first frame data is performed (see FIG. 7A). In this case, it is assumed that the count value is "0" as an initial state. Therefore, in the pixel data extraction block R11, since the pixel position of the pixel data to be extracted is obtained as x=0, y=0 from the formula 3 and the formula 4, the pixel data a0 is extracted.

Further, in the pixel data extraction block R21, since the pixel position of the pixel data to be extracted is obtained as x=2, y=0 from the formula 3 and the formula 4, the pixel data b0 is extracted. Thus, the transfer control section 200 of the information processing device 100 transfers the pixel data a0, b0 thus extracted and the count value "0" at that point of time to the image display device 300 using the transfer section 500. It should be noted that the pixel data thus transferred is shown in (i) of FIG. 7A in gray color.

On the other hand, in the image display device 300, when receiving the pixel data a0, b0 and the count value "0" thus transferred thereto, the writing pixel position and the writing pixel count of the pixel data a0, b0 are calculated based on the count value thus received.

The writing pixel position of the pixel data thus transferred thereto can be calculated along the formula 3 and the formula 4 described above. Further, the writing pixel count of the pixel data thus transferred thereto can be calculated along the following expression.

$$\text{roundup}\{hv \cdot hh/(cnt+1)\} \quad (5)$$

It should be noted that in the expression (5), "hh" denotes the horizontal pixel count of the pixel data writing block, and "hv" denotes the vertical pixel count of the pixel data writing block. Further, "roundup{ }" denotes that the numerical value in the parenthesis { } is rounded up.

For example, the writing pixel position of the pixel data in the pixel data writing block W11 is obtained as x=0, y=0 in the case in which the count value is "0," x=1, y=0 in the case in which the count value is "1," x=0, y=1 in the case in which the count value is "2," x=1, y=1 in the case in which the count value is "3," since the coordinate of "offset" is (0, 0).

On the other hand, the writing pixel position of the pixel data in the pixel data writing block W21 is obtained as x=2, y=0 in the case in which the count value "0," x=3, y=0 in the case in which the count value is "1," x=2, y=1 in the case in which the count value is "2," x=3, y=1 in the case in which the count value is "3," since the coordinate of "offset" is (2, 0).

Further, the writing pixel count of the pixel data in the pixel data writing block W11 is obtained as follows by the calculation along the expression (5) in the case in which the count value is "0."

$$\text{roundup}\{2 \times 2/(0+1)\} = \text{roundup}\{4\} = 4$$

In the case in which the count value is "1," it is obtained as follows by the calculation along the expression (5).

$$\text{roundup}\{2 \times 2/(1+1)\} = \text{roundup}\{4\} = 2$$

In the case in which the count value is "2," it is obtained as follows by the calculation along the expression (5).

$$\text{roundup}\{2 \times 2/(2+1)\} = \text{roundup}\{4/3\} = 2$$

In the case in which the count value is "3," it is obtained as follows by the calculation along the expression (5).

$$\text{roundup}\{2 \times 2/(3+1)\} = \text{roundup}\{4/4\} = 1$$

Incidentally, since the count value is "0" in the transfer stage of the first frame data, the writing pixel position of the pixel data a0 in the pixel data writing block W11 is (0, 0), and the writing pixel position of the pixel data b0 in the pixel data writing block W21 is (2, 0). Further, the writing pixel count of the pixel data a0, b0 in the case in which the count value is "0" is obtained as "4" along the expression (5). This means that the pixel data a0, b0 thus transferred thereto are written into four pixel positions of the respective pixel data writing blocks W11, W21.

Therefore, in the transfer stage of the first frame data, the pixel data a0, b0 are respectively written into the pixel data writing blocks W11, W21 in the manner as shown in (ii) of FIG. 7A. It should be noted that in the pixel data writing blocks W11, W21 shown in (ii) of FIG. 7A, the area indicated in gray color represents that the pixel data a0, b0 are written into the area due to the transfer of the first frame data.

Subsequently, the information processing device 100 checks how high the level of the consistency between the next frame data (referred to as second frame data) and the previous frame data (referred to as the first frame data) having already been written into the frame data storage section 150 is. Here, it is assumed that there is a high level of consistency between the second frame data and the first frame data. In this case, the count value of the frame counter 160 is incremented so that the count value becomes "1."

In the information processing device 100, the positions of the pixels to be extracted in the pixel data extraction blocks R11, R21 are calculated along the formula 3 and the formula 4. In this case, since the count value is "1," and the coordinate of "offset" is (0, 0) in the pixel data extraction block R11, the position of the pixel to be extracted is obtained as x=1, y=0, and the pixel data a1 is extracted. Further, since the count value is "1," and the coordinate of "offset" is (2, 0) in the pixel data extraction block R21, the position of the pixel to be extracted is obtained as x=3, y=0, and the pixel data b1 is extracted.

Thus, the transfer control section 200 of the information processing device 100 transfers the pixel data a1, b1 thus extracted and the count value "1" at that point of time to the image display device 300 using the transfer section 500. It should be noted that the pixel data thus transferred is shown in (i) of FIG. 7B in gray color.

On the other hand, in the image display device 300, when receiving the pixel data a1, b1 and the count value "1" thus transferred thereto, the writing pixel position and the writing pixel count of the pixel data a1, b1 are calculated based on the count value thus received.

Also in this case, the writing pixel position of the pixel data a1, b1 can be calculated along the formula 3 and the formula 4 described above. Specifically, since the count value is "1" in the transfer stage of the second frame data, the writing pixel position of the pixel data a1 in the pixel data writing block W11 is (1, 0), and the writing pixel position of the pixel data b1 in the pixel data writing block W21 is (3, 0).

Further, the writing pixel count of the pixel data a1, b1 in the case in which the count value is "1" is obtained as "2" along the expression (5). This means that the pixel data a1, b1 are each written into two pixels in the respective pixel data writing blocks.

Figure 7B:
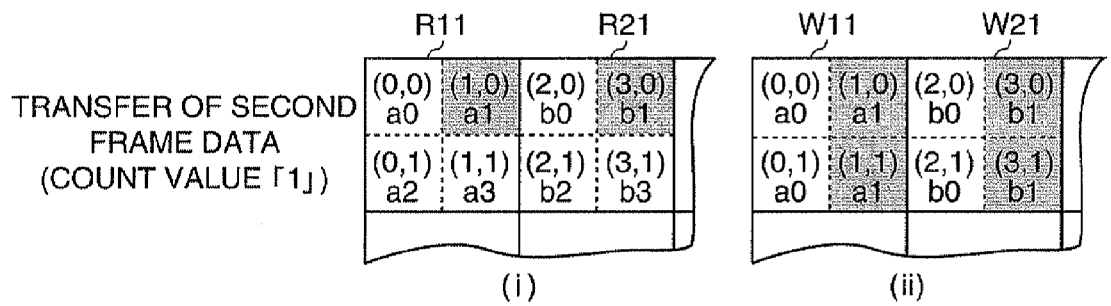

Specifically, the pixel data a1 is written into the two pixel positions (assumed to be the two pixel positions adjacent to each other in the vertical direction) started from the pixel position (1, 0) in the pixel data writing block W11 (see (ii) of FIG. 7B). It should be noted that in the pixel data writing block W11 in (ii) of FIG. 7B, the area indicated in gray color represents that the pixel data a1 is written into the area (the area is updated with the pixel data a1).

Further, the pixel data b1 is written into the two pixel positions (assumed to be the two pixel positions adjacent to each other in the vertical direction) started from the pixel position (3, 0) in the pixel data writing block W21 (see (ii) of FIG. 7B). It should be noted that in the pixel data writing block W21 in (ii) of FIG. 7B, the area indicated in gray color represents that the pixel data b1 is written into the area (the area is updated with the pixel data b1).

Thus, in the transfer stage of the second frame data, the pixel data a0 is written in the two pixel positions and the pixel data a1 is written in the two pixel positions in the pixel data writing block W11, and the pixel data b0 is written in the two pixel positions and the pixel data b1 is written in the two pixel positions in the pixel data writing block W21.

Subsequently, the information processing device 100 checks how high the level of the consistency between the next frame data (referred to as third frame data) and the previous frame data (referred to as the second frame data) having already been written into the frame data storage section 150 is. Here, it is assumed that there is a high level of consistency between the third frame data and the second frame data. In this case, the count value of the frame counter 160 is incremented so that the count value becomes "2."

In the information processing device 100, the extraction pixel positions in the pixel data extraction blocks R11, R21 are calculated along the formula 3 and the formula 4. In this case, since the count value is "2," and the coordinate of "offset" is (0, 0) in the pixel data extraction block R11, the position of the pixel to be extracted is obtained as x=0, y=1, and the pixel data a2 is extracted. Further, since the count value is "2," and the coordinate of "offset" is (2, 0) in the pixel data extraction block R21, the position of the pixel to be extracted is obtained as x=2, y=1, and the pixel data b2 is extracted. Thus, the transfer control section 200 of the information processing device 100 transfers the pixel data a2, b2 thus extracted and the count value "2" at that point of time to the image display device 300 using the transfer section 500. It should be noted that the pixel data thus transferred is shown in (i) of FIG. 7C in gray color.

On the other hand, in the image display device 300, when receiving the pixel data a2, b2 and the count value "2" thus transferred thereto, the writing pixel position and the writing pixel count of the pixel data a2, b2 are calculated based on the count value thus received.

Also in this case, the writing pixel position of the pixel data a2, b2 can be calculated along the formula 3 and the formula 4 described above. Specifically, since the count value is "2" in the transfer stage of the third frame data, the writing pixel position of the pixel data a2 in the pixel data writing block W11 is (0, 1), and the writing pixel position of the pixel data b2 in the pixel data writing block W21 is (2, 1).

Further, the writing pixel count of the pixel data a2, b2 in the case in which the count value is "2" is obtained as "2" along the expression (5). This means that the pixel data a2, b2 are each written into two pixels in the respective pixel data writing blocks.

Figure 7C:
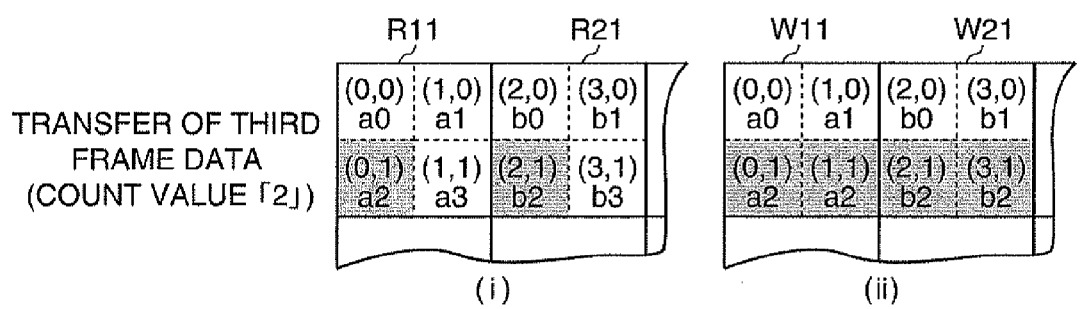

Specifically, the pixel data a2 is written into the two pixel positions (assumed to be the two pixel positions adjacent to each other in the horizontal direction) started from the pixel position (0, 1) in the pixel data writing block W11 (see (ii) of FIG. 7C). It should be noted that in the pixel data writing block W11 in (ii) of FIG. 7C, the area indicated in gray color represents that the pixel data a2 is written into the area (the area is updated with the pixel data a2).

Further, the pixel data b2 is written into the two pixel positions (assumed to be the two pixel positions adjacent to each other in the horizontal direction) started from the pixel position (2, 1) in the pixel data writing block W21 (see (ii) of FIG. 7C). It should be noted that in the pixel data writing block W21 in (ii) of FIG. 7C, the area indicated in gray color represents that the pixel data b2 is written into the area (the area is updated with the pixel data b2).

Thus, in the transfer stage of the third frame data, the pixel data a0, a1 are respectively written in the one pixel position and the pixel data a2 is written in the two pixel positions in the pixel data writing block W11, and the pixel data b0, b1 are respectively written in the one pixel position and the pixel data b2 is written in the two pixel positions in the pixel data writing block W21.

subsequently, the information processing device 100 checks how high the level of the consistency between the next frame data (referred to as fourth frame data) and the previous frame data (referred to as the third frame data) having already been written into the frame data storage section 150 is. Here, it is assumed that there is a high level of consistency between the fourth frame data and the third frame data. In this case, the count value of the frame counter 160 is incremented so that the count value becomes "3."

In the information processing device 100, the extraction pixel positions in the pixel data extraction blocks R11, R21 are calculated along the formula 3 and the formula 4. In this case, since the count value is "3," and the coordinate of "offset" is (0, 0) in the pixel data extraction block R11, the position of the pixel to be extracted is obtained as x=1, y=1, and the pixel data a3 is extracted. Further, since the count value is "3," and the coordinate of "offset" is (2, 0) in the pixel data extraction block R21, the position of the pixel to be extracted is obtained as x=3, y=1, and the pixel data b3 is extracted.

Thus, the transfer control section 200 of the information processing device 100 transfers the pixel data a3, b3 thus extracted and the count value "3" at that point of time to the image display device 300 using the transfer section 500. It should be noted that the pixel data thus transferred is shown in (i) of FIG. 7D in gray color.

On the other hand, in the image display device 300, when receiving the pixel data a3, b3 and the count value "3" thus transferred thereto, the writing pixel position and the writing pixel count of the pixel data a3, b3 are calculated based on the count value thus received.

Also in this case, the writing pixel position of the pixel data a3, b3 can be calculated along the formula 3 and the formula 4 described above. Specifically, since the count value is "3" in the transfer stage of the fourth frame data, the writing pixel position of the pixel data a3 in the pixel data writing block W11 is (1, 1), and the writing pixel position of the pixel data b3 in the pixel data writing block W21 is (3, 1).

Further, the writing pixel count of the pixel data a3, b3 at that point of time is obtained as "3" along the expression (5) since the count value is "3." This means that the pixel data a3, b3 are each written into only one pixel in the respective pixel data writing blocks.

Figure 7D:
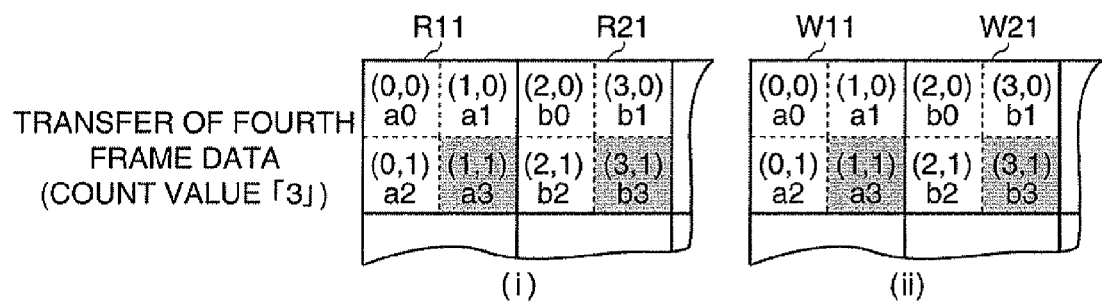

Specifically, the pixel data a3 is written into the pixel position (1, 1) in the pixel data writing block W11 (see (ii) of FIG. 7D). It should be noted that in the pixel data writing block W11 in (ii) of FIG. 7D, the area indicated in gray color represents that the pixel data a3 is written into the area (the area is updated with the pixel data a3).

Further, the pixel data b3 is written into the pixel position (3, 1) in the pixel data writing block W21 (see (ii) of FIG. 7D). It should be noted that in the pixel data writing block W21 in (ii) of FIG. 7D, the area indicated in gray color represents that the pixel data b3 is written into the area (the area is updated with the pixel data b3).

Thus, in the transfer stage of the fourth frame data, the pixel data a0, a1, a2, and a3 are respectively written in the one pixel position in the pixel data writing block W11, and the pixel data b0, b1, b2, and b3 are respectively written in the one pixel position in the pixel data writing block W21.

By performing the process as explained hereinabove, even in the case in which the transfer ratio is "4," namely the transfer section 500 only has the transfer capacity ¼ of the amount of data required by the image display device 300, it is possible to transfer the amount of data required by the image display device 300 without reducing the resolution or the frame rate so as to suit to the transfer section 500. It should be noted that in the image display device 300, the resolution is gradually increased after displaying the first frame data, and at the moment when the fourth frame data is displayed, it becomes possible to display the image data with the same resolution as that of the content.

Incidentally, also on and after the fifth frame data, when it is determined that the level of the consistency between the present frame data and the previous frame data is high, the count value is continuously incremented in such a manner as "4, 5, 6, . . . ." In this case, the extraction of the pixel data in the information processing device 100 and the writing of the pixel data in the image display device 300 are executed in such a manner as described below.

Figure 8A:
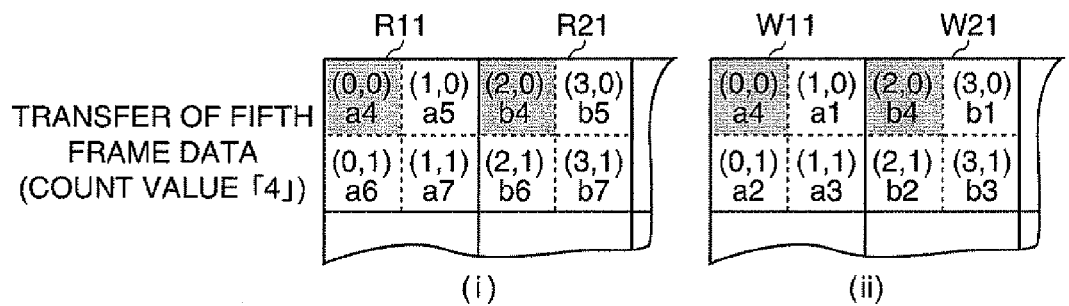
FIGS. 8A through 8D are diagrams for explaining a process when the count value becomes equal to or greater than a transfer ratio (equal to or greater than the number of pixels forming a processing unit).

FIGS. 8A through 8D are diagrams for explaining a process to be executed when the count value becomes equal to or greater than a transfer ratio (the number of pixels forming a processing unit). As shown in FIG. 8A, when the count value becomes "4" in the stage of transferring the fifth frame data, the upper left pixel data (assumed to be represented by pixel data a4 in the pixel data extraction block R11 or pixel data b4 in the pixel data extraction block R21) out of the four pixels of each of the pixel data extraction blocks R11, R21 is extracted along the formula 3 and the formula 4. Then, the pixel data a4, b4 thus extracted and the count value "4" at that point of time are transferred to the image display device 300. It should be noted that the pixel data thus transferred is shown in (i) of FIG. 8A in gray color.

On the other hand, in the writing process in the image display device 300, even in the case in which the count value becomes equal to or larger than "4" the writing pixel position of the pixel data transferred thereto can be obtained by the formula 3 and the formula 4, and the writing pixel count can be obtained by the expression (5).

Specifically, in the pixel data writing block W11, since the count value is "4," and the coordinate of "offset" is (0, 0), the writing pixel position of the pixel data a4 is (0, 0). Further, in the pixel data writing block W21, since the count value is "4," and the coordinate of "offset" is (2, 0), the writing pixel position of the pixel data b4 is (2, 0).

Further, the writing pixel count of the pixel data a4, b4 can be calculated along the expression (5). Specifically, in this case, since the count value is "4," it is obtained as follows by the calculation along the expression (5).

roundup{2×2/(4+1)}=roundup{0.8}=1

This means that the pixel data a4, b4 are each written into one pixel in the respective pixel data writing blocks. Specifically, the pixel data a4 is written into the pixel position (0, 0) in the pixel data writing block W11 (see (ii) of FIG. 8A). It should be noted that in the pixel data writing block W11 in (ii) of FIG. 8A, the area indicated in gray color represents that the pixel data a4 is written into the area (the area is updated with the pixel data a4).

Further, the pixel data b4 is written into a pixel position corresponding to the pixel position (2, 0) in the pixel data writing block W21 (see (ii) of FIG. 8A). It should be noted that in the pixel data writing block W21 in (ii) of FIG. 8A, the area indicated in gray color represents that the pixel data b4 is written into the area (the area is updated with the pixel data b4).

Thus, in the transfer stage of the fifth frame data, there is caused the state in which the pixel data a4, a1, a2, and a3 are written in the pixel data writing block W11, and the pixel data b4, b1, b2, and b3 are written in the pixel data writing block W21.

Subsequently, the information processing device 100 checks how high the level of the consistency between sixth frame data and the previous frame data (referred to as the fifth frame data) having already been written into the frame data storage section 150 is. Here, it is assumed that there is a high level of consistency between the sixth frame data and the fifth frame data. In this case, the count value of the frame counter 160 is incremented so that the count value becomes "5."

In the information processing device 100, the extraction pixel positions in the pixel data extraction blocks R11, R21 are calculated along the formula 3 and the formula 4. In this case, in the pixel data extraction block R11, pixel data a5 is extracted. Further, in the pixel data extraction block R21, pixel data b5 is extracted. Thus, the transfer control section 200 of the information processing device 100 transfers the pixel data a5, b5 thus extracted and the count value "5" at that point of time to the image display device 300 using the transfer section 500. It should be noted that the pixel data thus transferred is shown in (i) of FIG. 8B in gray color.

On the other hand, in the image display device 300, when receiving the pixel data a5, b5 and the count value "5" thus transferred thereto, the writing pixel position and the writing pixel count of the pixel data a5, b5 are calculated based on the count value "5" thus received.

In this case, in the pixel data writing block W11, since the count value is "5," and the coordinate of "offset" is (0, 0), the writing pixel position of the pixel data a5 is (1, 0). Further, in the pixel data writing block W21, since the count value is "5," and the coordinate of "offset" is (2, 0), the writing pixel position of the pixel data b5 is (3, 0).

Further, since the count value is "5," the writing pixel count of the pixel data a5, b5 is obtained as follows by the calculation along the expression (5).

$$\mathrm{roundup}\{2\times 2/(5+1)\}=\mathrm{roundup}\{0.66\}=1$$

This means that the pixel data a5, b5 are each written into one pixel in the respective pixel data writing blocks.

Figure 8B:
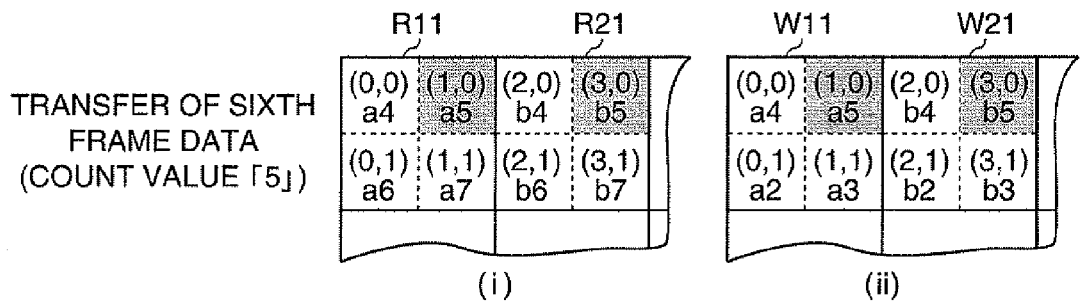

Specifically, the pixel data a5 is written into the pixel position (1, 0) in the pixel data writing block W11 (see (ii) of FIG. 8B). It should be noted that in the pixel data writing block W11 in (ii) of FIG. 8B, the area indicated in gray color represents that the pixel data a5 is written into the area (the area is updated with the pixel data a5).

Further, the pixel data b5 is written into the pixel position (3, 0) in the pixel data writing block W21 (see (ii) of FIG. 8B). It should be noted that in the pixel data writing block W21 in (ii) of FIG. 8B, the area indicated in gray color represents that the pixel data b5 is written into the area (the area is updated with the pixel data b5).

Thus, when transferring the sixth frame data, there is caused the state in which the pixel data a4, a5, a2, and a3 are written in the pixel data writing block W11, and the pixel data b4, b5, b2, and b3 are written in the pixel data writing block W21.

Subsequently, the information processing device 100 checks how high the level of the consistency between the next frame data (referred to as seventh frame data) and the previous frame data (referred to as the sixth frame data) having already been written into the frame data storage section 150 is. Here, it is assumed that there is a high level of consistency between the seventh frame data and the sixth frame data. In this case, the count value of the frame counter 160 is incremented so that the count value becomes "6."

In the information processing device 100, the extraction pixel positions in the pixel data extraction blocks R11, R21 are calculated along the formula 3 and the formula 4. In this case, in the pixel data extraction block R11, pixel data a6 is extracted. Further, in the pixel data extraction block R21, pixel data b6 is extracted. Thus, the transfer control section 200 of the information processing device 100 transfers the pixel data a6, b6 thus extracted and the count value "6" at that point of time to the image display device 300 using the transfer section 500. It should be noted that the pixel data thus transferred is shown in (i) of FIG. 8C in gray color.

On the other hand, in the image display device 300, when receiving the pixel data a6, b6 and the count value "6" thus transferred thereto, the writing pixel position and the writing pixel count of the pixel data a6, b6 are calculated based on the count value thus received.

In this case, in the pixel data writing block W11, since the count value is "6," and the coordinate of "offset" is (0, 0), the writing pixel position of the pixel data a6 is (0, 1). Further, regarding the writing pixel position of the pixel data b6 in the pixel data writing block W21, since the count value is "6," and the coordinate of "offset" is (2, 0), the writing pixel position of the pixel data b6 is (2, 1).

Further, in this case, since the count value is "6," the writing pixel count of the pixel data a6, b6 is obtained as follows by the calculation along the expression (5).

$$\mathrm{roundup}\{2\times 2/(6+1)\}=\mathrm{roundup}\{0.57\}=1$$

This means that the pixel data a6, b6 are each written into one pixel in the respective pixel data writing blocks.

Figure 8C:
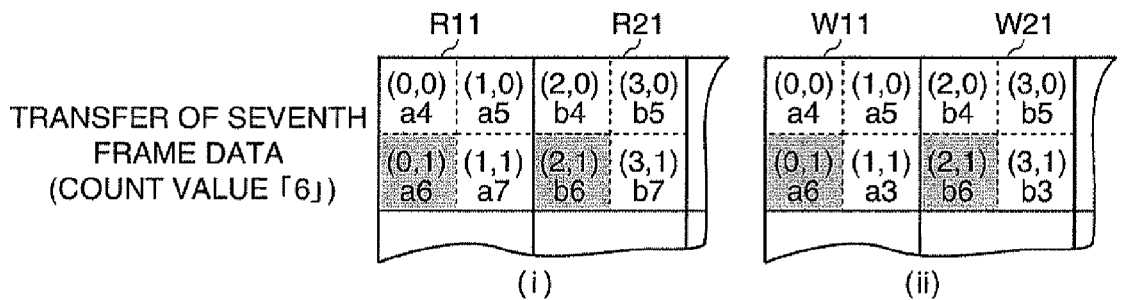

Specifically, the pixel data a6 is written into the pixel position (1, 0) in the pixel data writing block W11 (see (ii) of FIG. 8C). It should be noted that in the pixel data writing block W11 in (ii) of FIG. 8C, the area indicated in gray color represents that the pixel data a6 is written into the area (the area is updated with the pixel data a6).

Further, the pixel data b6 is written into the pixel position (3, 0) in the pixel data writing block W21 (see (ii) of FIG. 8C). It should be noted that in the pixel data writing block W21 in (ii) of FIG. 8C, the area indicated in gray color represents that the pixel data b6 is written into the area (the area is updated with the pixel data b6).

Thus, when transferring the seventh frame data, there is caused the state in which the pixel data a4, a5, a6, and a3 are written in the pixel data writing block W11, and the pixel data b4, b5, b6, and b3 are written in the pixel data writing block W21.

Subsequently, the information processing device 100 checks how high the level of the consistency between the next frame data (referred to as eighth frame data) and the previous frame data (referred to as the seventh frame data) having already been written into the frame data storage section 150 is. Here, it is assumed that there is a high level of consistency between the eighth frame data and the seventh frame data. In this case, the count value of the frame counter 160 is incremented so that the count value becomes "7."

In the information processing device 100, the extraction pixel positions in the pixel data extraction blocks R11, R21 are calculated along the formula 3 and the formula 4. In this case, in the pixel data extraction block R11, pixel data a7 is extracted. Further, in the pixel data extraction block R21, pixel data b7 is extracted. Thus, the transfer control section 200 of the information processing device 100 transfers the pixel data a7, b7 thus extracted and the count value "7" at that point of time to the image display device 300 using the transfer section 500. It should be noted that the pixel data thus transferred is shown in (i) of FIG. 8D in gray color.

On the other hand, in the image display device 300, when receiving the pixel data a7, b7 and the count value "7" thus transferred thereto, the writing pixel position and the writing pixel count of the pixel data a7, b7 are calculated based on the count value thus received.

In this case, in the pixel data writing block W11, since the count value is "7," and the coordinate of "offset" is (0, 0), the writing pixel position of the pixel data a7 is (1, 1). Further, regarding the writing pixel position of the pixel data b7 in the pixel data writing block W21, since the count value is "7," and the coordinate of "offset" is (2, 0), the writing pixel position of the pixel data b7 is (3, 1).

Further, since the count value is "7," the writing pixel count of the pixel data a7, b7 is obtained as follows by the calculation along the expression (5).

$$\mathrm{roundup}\{2 \times 2/(7+1)\} = \mathrm{roundup}\{0.5\} = 1$$

This means that the pixel data a7, b7 are each written into one pixel in the respective pixel data writing blocks.

Figure 8D:
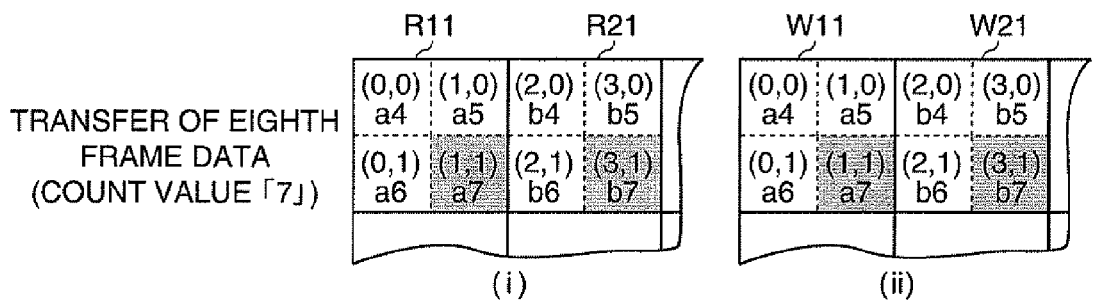

Specifically, the pixel data a7 is written into a pixel position corresponding to the pixel position (1, 1) in the pixel data writing block W11 (see (ii) of FIG. 8D). It should be noted that in the pixel data writing block W11 in (ii) of FIG. 8D, the area indicated in gray color represents that the pixel data a7 is written into the area (the area is updated with the pixel data a7).

Further, the pixel data b7 is written into a pixel position corresponding to the pixel position (3, 1) in the pixel data writing block W21 (see (ii) of FIG. 8D). It should be noted that in the pixel data writing block W21 in (ii) of FIG. 8D, the area indicated in gray color represents that the pixel data b7 is written into the area (the area is updated with the pixel data b7).

Thus, when transferring the eighth frame data, there is caused the state in which the pixel data a4, a5, a6, and a7 are written in the pixel data writing block W11, and the pixel data b4, b5, b6, and b7 are written in the pixel data writing block W21.

As described above, in the case in which the state of the substance of the content without substantial change continues for a long period of time, such a writing process as updating the pixel data having already been written in the writing pixel position with the pixel data transferred thereto at the present moment pixel-by-pixel is performed. Thus, it becomes possible to perform image display following the variation of the substance of the content while keeping the resolution constant in the case in which the substance of the content is varied gradually.

Further, in the case in which the substance (e.g., scene) of the content is varied dramatically in midstream of the process described above, and it is determined that the level of the consistency between the present frame data and the previous frame data is low, the value of the frame counter 160 becomes "0" (steps S9, S11 shown in FIG. 4), and the process returns to the step S3 shown in FIG. 4 once again to perform the process shown in FIGS. 7A through 7D.

Further, although only the pixel data extraction blocks R11, R21 and the pixel data writing blocks W11, W21 are explained in FIGS. 7A through 7D, and 8A through 8D, it is obvious that the same process is also performed on other pixel data extraction blocks and the pixel data writing blocks.

It should be noted that the invention is not limited to the embodiment described above, but can be put into practice with various modifications within the scope or the spirit of the invention. For example, the modifications described in (a) through (f) below are also possible.

(a) Although in the embodiment described above, there is shown the example of performing such a writing process as setting the writing pixel count in the image display device 300 to be "4" (see (ii) of FIG. 7A) for the first frame data (the count value is "0"), "2" (see (ii) of FIGS. 7B and 7C) for each of the second frame data (count value is "1") and the third frame data (the count value is "2"), or "1" (see (ii) of FIG. 7D) for the fourth frame data (the count value is "3"), with the count value started from 0 and until reaching 3, the invention is not limited thereto, but it is also possible to decrease the writing pixel count sequentially pixel by pixel in such a manner that the writing pixel count corresponding to the count value of "0" is "4", the writing pixel count corresponding to the count value of "1" is "3," the writing pixel count corresponding to the count value of "2" is "2," and the writing pixel count corresponding to the count value of "3" is "1."

(b) Although in the embodiment described above, there is shown the process of the case in which the transfer ratio is set to be "4," the transfer ratio is not limited to "4," but it is also possible to execute the process corresponding to the transfer ratio by setting the pixel count forming the processing unit in accordance with transfer ratio in the image display system.

(c) Although in the embodiment described above the extraction/transfer of the pixels and the writing (update) of the pixel in the pixel data extraction block and the pixel data writing block are explained using the example of performing them pixel-by-pixel, it is also possible to perform the extraction/transfer and writing (update) of the pixel by a plurality pixels such as two pixels.

(d) Although in the embodiment described above, the example of calculating the horizontal pixel count hh and the vertical pixel count hv of the pixel data extraction block and the pixel data writing block along the formula 1 and the formula 2 is explained, it is also possible to previously form a table from which the horizontal pixel count hh and the vertical pixel count hv corresponding to the transfer ratio can be obtained, and to obtain the horizontal pixel count hh and the vertical pixel count hv by referring to the table.

(e) Although in the embodiment described above, the example of calculating the writing pixel position and the writing pixel count of the pixel data in the image display device 300 using the formula 3, the formula 4, and the expression (5) is explained, it is also possible to previously form a table from which the writing pixel position and the writing pixel count of the pixel data corresponding to the count value at that point of time can be obtained, and to obtain the writing pixel position and the writing pixel count of the pixel data corresponding to the count value at that point of time by referring to the table.

(f) Although in the embodiment, the explanation is presented assuming that the image display device is a projector, the image display device is not limited to the projector, the invention can be applied to any image display system for transferring the image data corresponding to the content to be displayed to the image display device using the transfer section.

The entire disclosure of Japanese Patent Application No. 2009-002243, filed Jan. 8, 2009 is expressly incorporated by reference herein.

What is claimed is:

1. An image data processing method for an image display system, comprising:

providing the image display system with an image display device adapted to display an image based on image data, an information processing device adapted to transfer the image data to the image display device, and a transfer section intervening between the information processing device and the image display device;

obtaining a transfer ratio from a ratio between an amount of data the image display device can display every unit time and an amount of data the transfer section can transfer every unit time;

setting a plurality of pixel data extraction blocks, each of which includes a corresponding number of pixels to the transfer ratio, to the image data;

comparing present frame data and previous frame data of consecutive frames in the image data;

setting a pixel position of pixel data to be transferred at present moment in the present frame out of the pixel data of pixels included in each of the plurality of pixel data extraction blocks based on the result of the comparison in the comparing;

transferring the pixel data to be transferred, from the information processing device to the image display device;

setting a plurality of pixel data writing blocks corresponding to the plurality of pixel data extraction blocks in a display area of the image data;

receiving the pixel data, which is transferred from the information processing device, by the image display device;

setting a writing pixel position and a writing pixel count used when writing the pixel data, which is transferred in the transferring, into the pixel data writing block; and updating pixel data in the pixel data writing block by writing the pixel data into the pixel data writing block.

2. The image data processing method according to claim 1, further comprising:

updating a count value of a counter adapted to count a number of the consecutive frames based on the result of the comparison in the comparing, wherein the pixel position of the pixel data to be transferred from the information processing device to the image display device is set based on the count-value.

3. The image data processing method according to claim 2, wherein the count value updating is executed if it is determined that a level of consistency between the present frame data and the previous frame data is high based on the result of the comparing.

4. The image data processing method according to claim 2, wherein the pixel position of the pixel data to be transferred is determined based on a number of pixels included in the pixel data extraction block and the count value.

5. The image data processing method according to claim 2, wherein the pixel position of the pixel data to be transferred is set so as to be sequentially shifted in the pixel data extraction block in a predetermined order every time the count value is updated.

6. The image data processing method according to claim 2, wherein the writing pixel position of the pixel data in the pixel data writing block is set based on the number of pixels included in the pixel data extraction block and the count value of the counter at a present moment, and the writing pixel position is set so as to be sequentially shifted in the pixel data writing block in a predetermined order every time the count value is updated.

7. The image data processing method according to claim 2, wherein the writing pixel count of the pixel data in the pixel data writing block is set based on the number of pixels included in the pixel data extraction block and the count value at the present moment.

8. The image data processing method according to claim 2, wherein assuming the number of pixels included in the pixel data extraction block as n (n is a natural number), the writing pixel count is set so as to decrease under a predetermined rule as the count value increases until the count value reaches n−1.

9. The image data processing method according to claim 2, wherein assuming the number of pixels included in the pixel data extraction block as n (n is a natural number), when the count value exceeds n, the pixel data in a pixel position corresponding to a pixel position of the pixel data transferred is updated, out of the pixel data written in the writing pixel position.

10. The image data processing method according to claim 2, wherein the update of the count value is increment of the count value.

11. The image data processing method according to claim 1, wherein the amount of data the transfer section transfers every unit time is smaller than an amount of the image data and the amount of data the image display device can display every unit time.

12. The image data processing method according to claim 1, further comprising:

performing, by the information processing device, resolution conversion on the image data so as to have resolution equal to resolution the image display device has.

13. The image data processing method according to claim 1, wherein the pixel data extraction blocks and the pixel data writing blocks are each shaped as a rectangle, and a horizontal pixel count and a vertical pixel count of the rectangle are set so that a product of the horizontal pixel count and the vertical pixel count has a value equal to the transfer ratio.

14. An image display system, comprising:

an image display device adapted to display an image based on image data;

an information processing device adapted to transfer the image data to the image display device; and a transfer section intervening between the information processing device and the image display device, wherein the information processing device is configured to:

obtain a transfer ratio from a ratio between an amount of data the image display device can display every unit time and an amount of data the transfer section can transfer every unit time, set a plurality of pixel data extraction blocks, each of which includes a corresponding number of pixels to the transfer ratio, to the image data, compare present frame data with previous frame data of consecutive frames in the image data, set a pixel position of pixel data to be transferred at present moment in the present frame out of the pixel data of pixels included in each of the plurality of pixel data extraction blocks based on the result of the comparison, and transfer the pixel data to be transferred to the image display device, and the image display device is configured to:

set a plurality of pixel data writing blocks corresponding to the plurality of pixel data extraction blocks in a display area of the image data, receive the pixel data transferred from the information processing device, set a writing pixel position and a writing pixel count used when writing the pixel data, which is transferred, into the pixel data writing block, and write the pixel data into the pixel data writing block, thereby updating pixel data in the pixel data writing block.

* * * * *